US008958939B2

(12) United States Patent
Einecke et al.

(10) Patent No.: US 8,958,939 B2
(45) Date of Patent: Feb. 17, 2015

(54) SYSTEM, METHOD AND APPARATUS FOR UNSUPERVISED ADAPTATION OF THE PERCEPTION OF AN AUTONOMOUS MOWER

(71) Applicant: Honda Research Institute Europe GmbH, Offenbach/Main (DE)

(72) Inventors: Nils Einecke, Offenbach/Main (DE); Mathias Franzius, Offenbach/Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 37 days.

(21) Appl. No.: 13/738,155

(22) Filed: Jan. 10, 2013

(65) Prior Publication Data

US 2013/0190965 A1 Jul. 25, 2013

(30) Foreign Application Priority Data

Jan. 25, 2012 (EP) .................................. 12152452

(51) Int. Cl.
| | | |
|---|---|---|
| *G01C 22/00* | (2006.01) | |
| *A01D 34/00* | (2006.01) | |
| *A01D 34/04* | (2006.01) | |
| *A01B 69/00* | (2006.01) | |

(56) References Cited
(Continued)

(52) U.S. Cl.
CPC .............. *A01D 34/008* (2013.01); *A01D 34/04* (2013.01); *A01D 34/00* (2013.01); *A01B 69/001* (2013.01)
USPC ............................... 701/28; 700/245; 37/243

(58) Field of Classification Search
CPC ....... A01B 69/001; A01B 34/00; A01B 34/04; A01B 34/008
USPC ................................ 701/28; 700/245; 37/243
See application file for complete search history.

(56) References Cited

U.S. PATENT DOCUMENTS

| 6,832,000 | B2 | 12/2004 | Herman et al. | |
|---|---|---|---|---|
| 2004/0218829 | A1* | 11/2004 | Lee et al. ...................... | 382/261 |
| 2006/0151680 | A1 | 7/2006 | Franzen et al. | |

(Continued)

FOREIGN PATENT DOCUMENTS

| DE | 10327223 A1 | 1/2005 |
|---|---|---|
| EP | 2286653 A2 | 2/2011 |
| GB | 2257544 A | 1/1993 |

OTHER PUBLICATIONS

European Search Report dated Mar. 26, 2012 corresponding to European Patent Application No. 12152452.4.

(Continued)

*Primary Examiner* — Gertrude Arthur Jeanglaude
(74) *Attorney, Agent, or Firm* — Squire Patton Boggs (US) LLP

(57) ABSTRACT

The present invention presents a method and system for an autonomous mower attached with a camera, wherein the control of the parameters of the camera and the control of the mower movement and grass detection are optimized holistically during operation. The present invention mitigates the camera sensing limits by adapting the movement speed of the mower. Furthermore, the camera control optimizes the visibility of grass by using the grass mask of a grass segmentation to calculate updated exposure, gain and aperture values only from grass pixels. The grass segmentation tracks changes in the grass color that are caused by illumination differences. Optionally, the system is equipped with a head light used to further improve the camera signal quality in conjunction with the control of the camera parameters and the movement speed of the mower.

20 Claims, 4 Drawing Sheets

U.S. PATENT DOCUMENTS

2011/0040409 A1* 2/2011 Biber et al. .................. 700/259
2011/0295636 A1* 12/2011 Anderson .................. 705/7.13

OTHER PUBLICATIONS

Antonio J. R. Neves et al, "Autonomous Configuration of Parameters in Robotic Digital Cameras," Proc. of the 4th Iberian Conference on Pattern Recognition and Image Analysis, ibPRIA 2009, 8 pages.

Navid Nourani-Vatani et al., "Automatic Camera Exposure Control," Australian Conference on Robotics and Automation, Dec. 2007, 6 pages.

A. Schepelmann, "Identification & Segmentation of Lawn Grass Based on Color & Visual Texture Classifiers," Case Western Reserve University (CWRU), Master Thesis, Aug. 2010, pp. 1-77.

Rand C. Chandler, "Autonomous Agent Navigation Based on Textural Analysis," PhD Thesis, University of Florida, May 2003, pp. 1-72.

* cited by examiner

SYSTEM, METHOD AND APPARATUS FOR UNSUPERVISED ADAPTATION OF THE PERCEPTION OF AN AUTONOMOUS MOWER

CROSS REFERENCE TO RELATED APPLICATIONS

This application claims the benefit of priority to European Application No. 12152452.4 filed on Jan. 25, 2012.

BACKGROUND

1. Field

The present invention relates to a system and method for controlling an autonomous mower, e.g. lawn mower, and for adapting its perception, i.e. the combined sensing of the mower's environment ("environment" being the input field of the sensor(s)). In particular the present invention is for performing a combined control of sensor parameters, motor commands, and camera image computations of the autonomous mower. The present invention further relates to an autonomous mower equipped with said control system.

2. Description of Related Art

Autonomous or robotic mowers, e.g. lawn mowers, are an increasing market. Such mowers typically mow a lawn autonomously in a random brute-force fashion cutting only small pieces of grass in every run. Small grass pieces fall into the sod, thereby fertilizing the lawn. This principle is called mulching.

The term "autonomous mower" is well known to those skilled in the art an refers to an unmanned mower which has an autonomous drive unit in order to move the mower ("self-driving mower"), an onboard energy reservoir to power the drive unit, at least one sensor and a computing unit functionally connected to the sensor(s) and the drive unit.

In many commercial approaches of autonomous lawn mowers the mowing area is delimited by an electric border wire, which emits a weak electromagnetic field. This field is used by the autonomous mower to stay within the allowed mowing area, and to find a base station for recharging.

For avoiding static or dynamic obstacles that are not indicated by the border wire, some commercially available autonomous mowers use bump and sonar sensors. However, such mowers will still drive over small obstacles (like e.g. cellular phones, hoses or garden tools) lying on the grass, since such small obstacles are neither indicated by the border wire nor detected by the bump or sonar sensor. On the one hand side this can cause severe damage to the mowing blades, and on the other hand side this can also damage the small obstacles. Furthermore, most available autonomous mowers bump into objects, before they turn away, even those mowers that additionally use sonar sensors. This ultimately leads to many scratches on the outer shell of the mowers.

Some theoretical and/or experimental approaches are known in the state of the art, which seek to improve the commercially available mowers, wherein in particular the border wire is to be removed.

EP 2 286 653 A2 describes an autonomous lawn mower that combines a camera recognition with the output of a grass sensor. The grass sensor is used to bootstrap and update a classifier that classifies pixels as grass or non-grass based on their pixel values (e.g. color). Furthermore, the claims of the application describe a computer implementation of controlling a mower with a camera. However, the technique is limited to certain operation limits of the camera sensor. An intelligent control of the camera is not performed.

DE 103 27 223 A1 describes a mower, which uses laser light to scan the ground for non-grass areas, which are then avoided. Furthermore, the document describes a mower with a camera and a light unit with norm light for spectral analysis. However, the patent application is limited to good lighting conditions.

US 2006/0151680 A1 describes an active illumination on a lawn mower for recognizing the condition of turf grass. The document encompasses an adaptation of an active lighting, a layout of lighting (concentric circles) and a kind of lighting (LED).

U.S. Pat. No. 6,832,000 B2 suggests grass segmentation by calculating a color and a texture probability for each pixel and by classifying each pixel as grass or non-grass based on the probabilities. The patent, however, does not intend to apply the technique to autonomous lawn mowing. In particular, the described processing is not used to control movement of an autonomously mowing device.

"*Autonomous configuration of parameters in robotic digital cameras*, Neves et al, Proc. of the 4th Iberian Conference on Pattern Recognition and Image Analysis, ibPRIA 2009, Póvoa do Varzim, Portugal (June 2009)" explains a combined exposure, gain, brightness and white-balance control. However, no scene specific adaptation is carried out. The adaptation is based on the whole image only.

"*Automatic Camera Exposure Control*, N. Nourani-Vatani and J. Roberts, Australasian Conference on Robotics and Automation (December 2007)" describes an automatic exposure control for an omni-camera, which also features a mask for excluding the dark parts of a mirror support, which would lead to a wrong control due to bias. The mask can also be non-binary, which allows for a weighted influence of each pixel. However, the paper does not target for an optimal camera control for lawn mowers.

"*Identification & Segmentation of Lawn Grass Based on Color and Visual Texture Classifiers*, A. Schepelmann, Case Western Reserve University (CWRU), Master Thesis (August 2010)" describes a grass recognition system for an autonomous lawn mower (CWRU cutter). The grass detection is based on color and texture cues and the mask is not changing over time according to the scene layout changes. The approach employs classifiers, which are trained on some sample images. Although this approach includes a learning phase, the segmentation itself runs with a fixed parameter setting.

"*Autonomous Agent Navigation Based on Textural Analysis*, Rand Chandler, PhD thesis, University of Florida (2003)" describes a visual architecture for grass segmentation based on texture classification.

SUMMARY

In view of the above-mentioned disadvantages of the commercially available and the proposed autonomous mowers, the present invention is intended to improve the state of the art. In general the present invention aims to provide an improved system and method for controlling an autonomous mower, and presents a mower with improved autonomous mowing capabilities. A much desired improvement is to control the mower over a broader range of varying light conditions in comparison to the state of the art.

The present invention approaches the problems by extending the state of the art commercial mowers with additional camera sensing. Camera sensing has already been proposed by some of the above prior art documents, however, processing is typically done with fixed parameters of the imaging and control algorithms. As a consequence the approaches fail under varying illumination conditions that occur in real-world gardens.

In particular, the present invention is thus directed to a control system for an autonomous mower that is equipped with a plurality of sensors, at least one sensor being a camera, and with at least one motor, wherein the control system is adapted to perform a combined control of parameters of the plurality of sensors and commands of the at least one motor, and to perform computations on images obtained by the at least one camera.

Preferably, the control system comprises a grass detection module for using images from the at least one camera to classify pixels in the images to be grass or non-grass, thereby creating a grass map, a sensor control module for combining the grass map with current sensor data to improve the parameters of the plurality of sensors, wherein the intensities of the pixels marked as grass are used to adjust the parameters of the at least one camera, a motor control module for controlling the movement of the autonomous mower via the at least one motor according to the grass map and affected by parameters of the plurality of sensors that are changeable by the sensor control module, wherein the sensor control module is adapted to modify parameters of the motor control module, in order to improve the sensor data.

Preferably, the autonomous mower is equipped with means of lighting, and the sensor control module is adapted to switch on the means of lighting, if an operation limit of the at least one camera is reached. Thus, the mower can be used in dark lighting conditions, e.g. at night or in dark or shady areas.

Preferably, the control system is adapted to dim the means of lighting. Thus, the additional lighting can be incorporated smoothly by the sensor control module, e.g. to adapt camera parameters.

Preferably, the grass detection module is adapted to perform the grass detection by color segmentation. Color segmentation is easy to implement, but reliable. The color segmentation can be optimized for distinguishing green colors.

Preferably, the control system is adapted to adjust parameters over time, in order to keep track of slight changes of the grass color due to varying lighting conditions, grass conditions or different grass types.

Preferably, the sensor control module is adapted to adjust parameters, at least exposure, gain and/or aperture, of the at least one camera.

Preferably, the sensor control module is adapted to optimize the mean intensity of the camera images by equalizing the dynamic range.

Preferably, the sensor control module is adapted to instruct the motor control module to drive the autonomous mower slower, if the autonomous mower approaches an obstacle.

Preferably, the sensor control module is adapted to instruct the motor control module to drive the autonomous mower slower, if longer exposure times and/or longer times for adapting the camera exposure are required by the at least one camera. Thus, blur artifacts that occur in the images due to the longer exposure times can be avoided or reduced. Also adjustments of the camera can be performed, with sufficient time, when the mower approaches overexposed or underexposed areas.

Preferably, the sensor control module is adapted to instruct the motor control module to stop the autonomous mower for a certain time. During the stop time, the camera can for example acquire a high dynamic range image by combining two or more images with different camera parameter settings (e.g. different exposure times, gains and/or apertures)

Preferably, the autonomous mower is equipped with a sonar sensor, and the sensor control module is adapted to instruct the motor control module to drive the autonomous mower slower, if one of the plurality of sensors detects wind above a predetermined threshold value. The safety of the sonar sensor, which might be harmed by the wind, can thus be increased.

Preferably, the autonomous mower is equipped with an infrared sensor and an infrared light source, and the sensor control module is adapted to switch on/off or to dim the infrared light source, when the infrared sensor detects infrared light emission below a predetermined threshold value. If the sensor is a near infrared (NIR) sensor it can be used to detect obstacles that particularly reflect NIR light. If the sensor is a far-infrared (FIR) sensor it can be used to detect heat emitting obstacles, like persons or animals. The infrared sensor can also detect the reflected infrared light, if the infrared light source is switched on, to obtain further information of its surroundings.

Preferably, the autonomous mower has at least two cameras, wherein preferably one of the at least two cameras faces the rear of the autonomous mower, i.e. looks backwards in respect to the driving direction of the mower.

Preferably, the at least two cameras are a stereo camera, wherein both are facing in the same direction in this case, preferably to the front.

Preferably, at least one of the at least two cameras is a RGB camera and at least one is a near-infrared camera.

Preferably, the control system is adapted to set the same parameters for the at least two cameras, when the lighting conditions are normal, set different parameters for the at least two cameras, when the lighting conditions exhibit strong contrast, and to combine at least two of the camera images into a high dynamic range image.

The present invention is further directed to an autonomous mower comprising a plurality of sensors, preferably a sonar sensor and/or and an infrared sensor, at least one camera, at least one motor, preferably means of lighting and/or an infrared light source, and a control system according to the above description.

The present invention is further directed to a control method for an autonomous mower that is equipped with a plurality of sensors, at least one sensor being a camera, and with at least one motor, wherein the control method comprises steps of performing a combined control of parameters of the plurality of sensors and commands of the at least one motor, and performing computations on images obtained by the at least one camera.

Preferably, the control method comprises the steps of a grass detection step using images from the at least one camera to classify pixels in the images to be grass or non-grass, thereby creating a grass map, a sensor control steps combining the grass map with current sensor data to improve the parameters of the plurality of sensors, wherein the intensities of the pixels marked as grass are used to adjust the parameters of the at least one camera, a motor control step controlling the movement of the autonomous mower via the at least one motor according to the grass map and affected by parameters of the plurality of sensors that are changeable in the sensor control step, wherein the sensor control step modifies parameters used in the motor control step, in order to improve the sensor data.

As shown above, some of the known prior art also covers adaptive segmentation mechanisms that can keep track of changes in the grass color. Moreover, there is some existing work (e.g. in the robot soccer domain) of controlling the gain and exposure of a camera, in order to optimize the signal quality of the camera.

However, none of the known prior art considers the image processing, camera control and motor control as a holistic problem. Hence, the present invention targets at an intelligent mower control, which adapts to changes in the lighting conditions without any user intervention. The invention utilizes the access to the movement (motor) control, in order to improve the camera signal quality, especially when the camera hits physical limits, e.g. when high dynamic contrast is present.

Furthermore, the camera signal quality optimization is subject to the grass segmentation mask (i.e. the grass map created by the grass detection using color segmentation), thus concentrating on improving the signal quality for grass pixels only. This might lead to an over- or underexposure of non-grass pixels, but allows for a more robust detection of the grass pixels, which is way more important. In summary this invention has four major contributions:

First, a mower driving control (motor control module) is adapted in a way to alleviate the limits of the camera sensor. Nowadays cameras struggle to cover the wide range of illumination conditions that occur in real-world scenarios. Two major problems are low light conditions and strong intensity contrast. The first problem requires the camera to use large exposure times, which leads to motion blur when the camera is moving, or high gain values, which leads to an increase in camera noise. Thus in both cases the signal quality is bad. The present invention alleviates this problem by adequately reducing the movement speed of the mower. This enables to use larger exposure times without a deteriorated camera signal due to motion blur. The idea is that the higher the exposure times of the camera needs to be, the slower the mower is moving. The solution to the second problem is that when the mower approaches a strong contrast, the movement speed of the mower is reduced so that the camera has enough time to adapt, e.g. the exposure time, to the strong lighting difference. If this is not enough, the mower stops and captures two images with different exposure times, in order to generate a high dynamic range, HDR, image, covering a much larger intensity range.

Second, the invention employs an intelligent control of the camera exposure and gain tailored specifically for the application of lawn mowing. Instead of adapting the parameters of the camera by taking all pixel intensities in the current image into account, only the intensity of grass pixels is taken into account, in order to optimize in particular the visibility of grass areas. This leads to more robust grass detection, since the grass alone does not have as large a dynamic range as the whole garden scene.

Third, the invention uses a different target to optimize the camera signal quality. While state of the art approaches target at a mean pixel intensity of 0.5 for intensity ranges of [0 . . . 1] (i.e. from 0 to 1) (or 125 for intensity ranges of [0 . . . 255]) the present invention targets at a logarithmic equilibrium of the intensities within the dynamic range of the camera sensor. This means that one can double the irradiance exactly as often as halving it, before the major amount of the camera pixels reach the sensing limit. Thus, the camera can react well to both an increase in irradiance (e.g. driving from a shadow area into a sunny area) as to a decrease in irradiance (e.g. driving from a sunny area into a shadow area). Irradiance is the power of electromagnetic radiation per unit area (i.e. the radiative flux) incident on a surface. The radiant emittance or radiant exitance is the power per unit area radiated by a surface.

For example, if the minimum reasonable intensity of a camera pixel is 10, and the maximum intensity is 255, then the equilibrium is roughly at 50. This means one can double the equilibrium target exactly as often as halving it, before the limits of the camera sensor are reached, i.e. $50/2^{2.34}=10$ and $50*2^{2.34}=255$.

Fourth, the mower is optionally provided with lighting means, e.g. a head light. The lighting means enable mowing in low-light conditions, like night, where the maximal exposure and gain do not yield a good signal quality. The lighting is controlled in conjunction with the exposure and gain control of the camera, as well as with the driving speed of the mower. As long as the combination of camera parameter adaptation and speed reduction can cope with the lighting situation, the light is turned off. As soon as the driving speed needs to be set below a threshold value or the exposure and gain reach their limits, the lights are turned on. Preferably, the light is dimmable, in order to allow for a smooth transition of the lighting conditions, which eases the holistic control of the camera exposure and gain, the mower movement speed, and the active lighting.

For further robustness, already known techniques such as adaptive color segmentation may be used. The adaptive grass segmentation continuously follows the changes in color, which may occur due to lighting changes (e.g. sunlight becomes more red in the evening) or the state of the grass (e.g. wet grass after rain becomes darker, dried grass becomes less saturated). Additionally, the grass segmentation module is initialized before the first usage by learning the specific grass color of a garden from sample views. This initialization can also be used for resetting the grass segmentation module of the mower to a defined state.

BRIEF DESCRIPTION OF THE DRAWINGS

In the following, the present invention will be explained in more detail with reference to the attached drawings.

DETAILED DESCRIPTION

Figure 1:
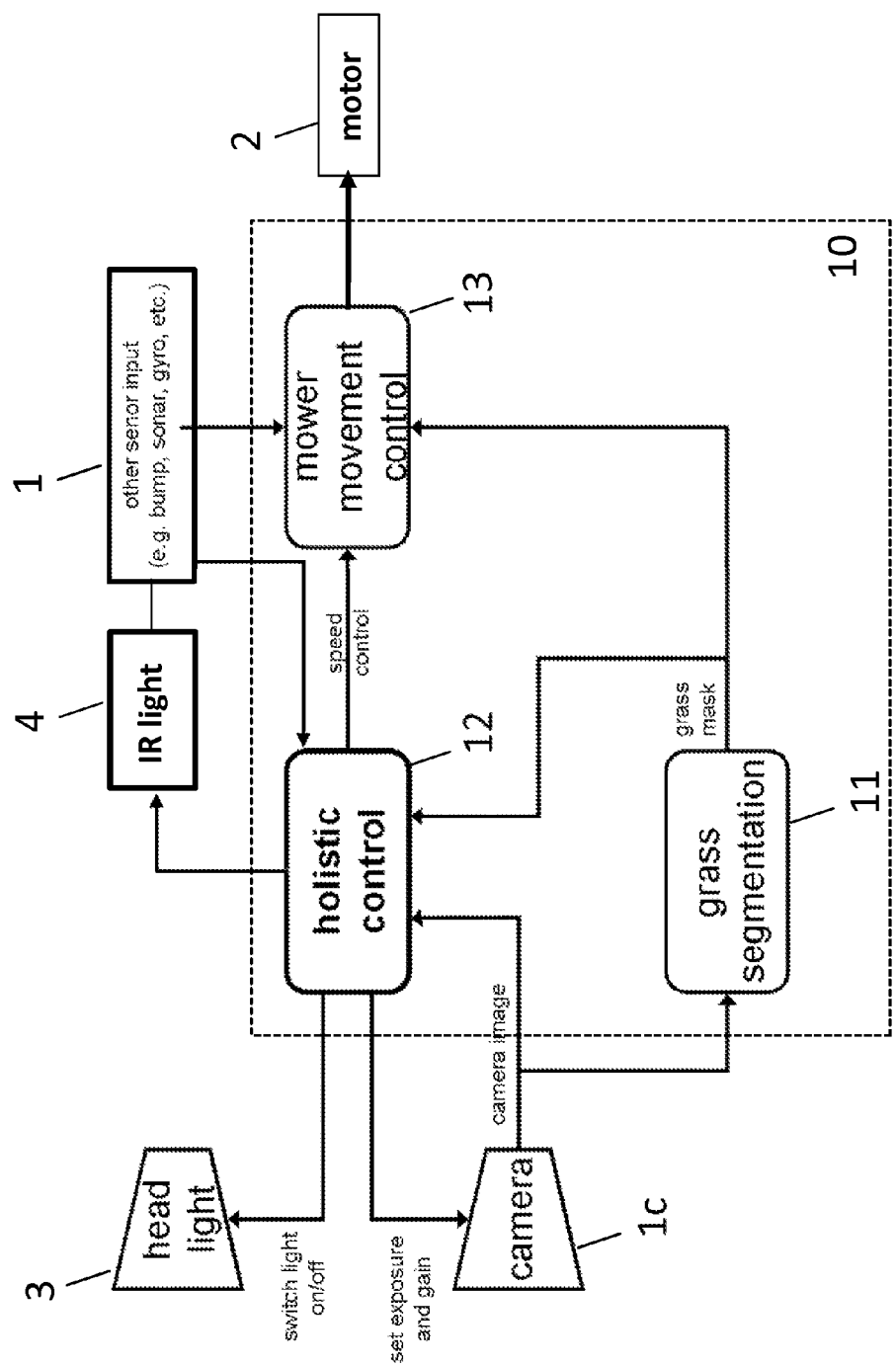
FIG. 1 shows a system for controlling an autonomous mower according to the present invention.

The present invention relates to an automatic mower, which has at least one camera $1c$, preferably a plurality of other sensors 1, like a sonar sensor 1s or infrared sensor $1i$, at least one propulsion system, like a motor 2, and optionally at least one a head light or lighting means 3 and/or an IR light. Preferably, the mower is a lawn mower, but it can also be some other kind of mower. The mower is equipped with a control system 10.

The control system 10 of the mower has a module 11 for grass detection and a module 13 for motor control (i.e. control of the mower movement), which uses the output of the grass detection module 11 for issuing motor commands that for example allow the mower to avoid obstacles in its path or to navigate to a certain target, e.g. a home base for recharging the mower.

The control system 10 further comprises an intelligent holistic control module 12, which optimizes in particular the camera signal quality for grass detection by means of adapting camera parameters (e.g. exposure, gain and aperture), influences the motor control module 13, controls the plurality of sensors 1, and/or controls the optional lighting means 3 in a coherent manner, as is shown in FIG. 1. In order to optimize the visibility of grass, the holistic control module (also referred to as sensor control module) 12 takes only pixels into account, which are labeled as grass by the grass detection module 11. This is in sharp contrast with classical approaches, which rather aim at an overall image signal improvement, irrespective of the actual task that is to be solved, i.e. the detection of grass.

In classical robotic lawn mower systems, the control of the mower movement is independent of the control of the camera (parameters), i.e. the movement control mechanism tries to reach a target of its own (e.g. obstacle avoidance), without taking the capabilities of the camera into account. In contrast the present invention has the sensor control module 12, which is shown in FIG. 1, and which is used to communicate with the mower movement control (also referred to as motor control module 13) by requesting a certain driving speed for the mower, and thus improving the image quality for grass detection, especially when the camera 1c reaches certain limits.

As an input, the sensor control module 12 gets the plain camera image and a grass segmentation of the current image calculated by the grass detection module 11. The grass detection module 11 computes a grass mask or grass map, for example, by simple color and saturation thresholding of the camera image. The grass mask or grass map indicates either in a binary manner, if a pixel is a grass pixel, or by means of a confidence, how likely a pixel is a grass pixel.

Figure 2:
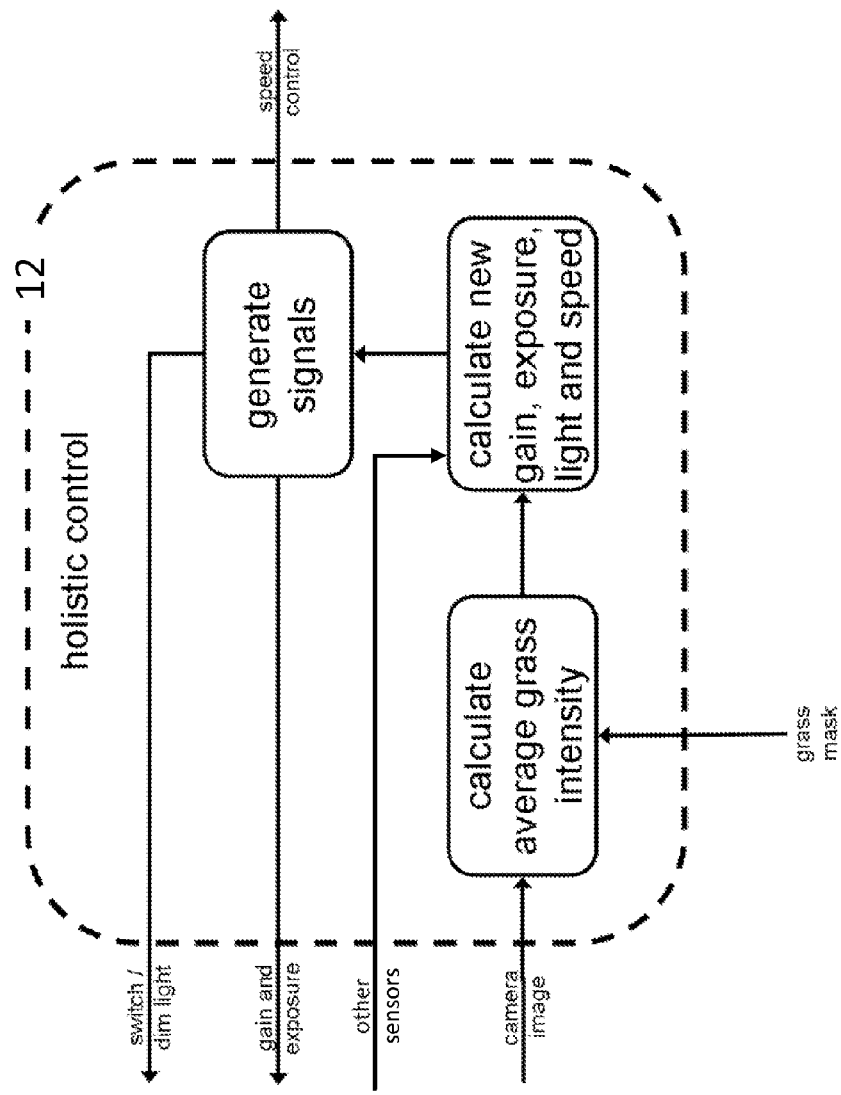
FIG. 2 shows a (holistic) sensor control module of the system of the present invention.

The sensor control module 12 works as depicted in FIG. 2. First the sensor control module 12 uses the grass mask and the camera image to compute the current mean intensity of the grass pixels in the current camera image. The mean intensity is then compared in a second step to a target mean intensity (which is pre-defined and is set in a way that it leads to best possible image quality for grass segmentation), and from the result of the comparison new exposure, gain and aperture values for the camera 1c are computed. Furthermore, the movement speed of the mower, and if available the lighting means 3, are taken into account, i.e. a speed control signal is generated, and the lighting means 3 can be switched on/off or can be dimmed. Thereby, the sensor control module 12 is able to optimize for good grass visibility (e.g. to minimize the number of over- and under-exposed grass pixels).

Figure 3:
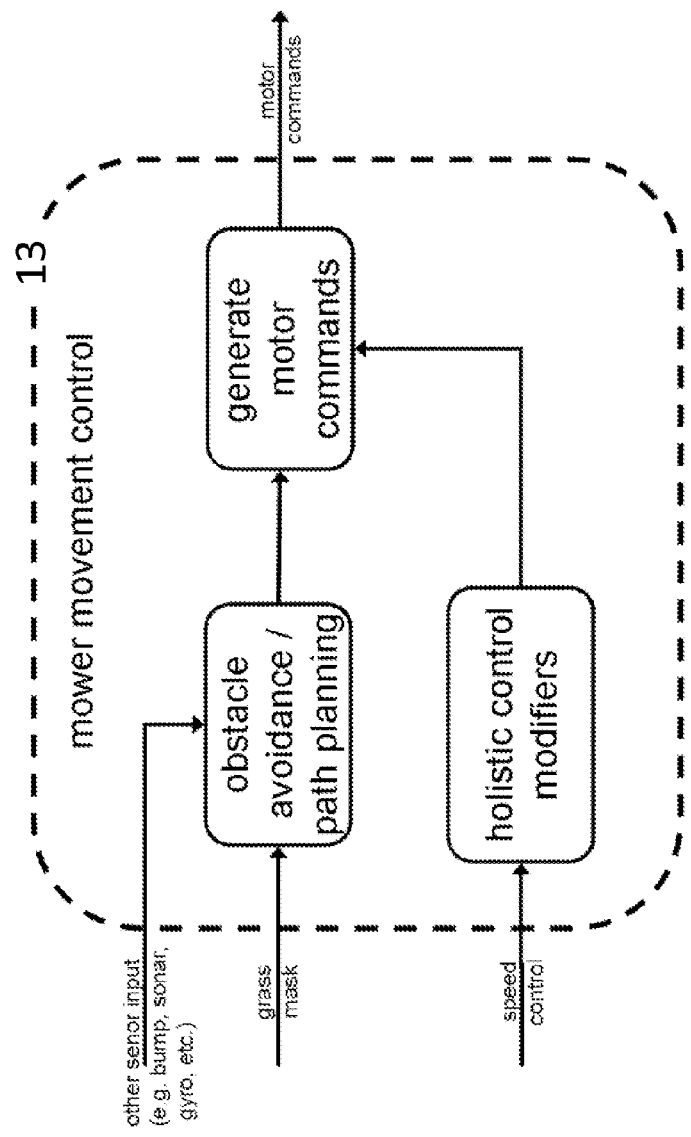
FIG. 3 shows a (movement) motor control module of the system of the present invention.

The mower (movement) control module 13 (see FIG. 3) uses the grass mask to realize an intelligent movement of the autonomous lawn mower. This may encompass obstacle avoidance, path planning or mapping. The motor commands itself can be issued with respect to any of the input signals of the plurality of sensors 1, i.e. any constraints that may be violated (e.g. too fast movement that leads to motion blur). Further, the mower control module 13 includes the speed control signal, which is received from the sensor control module 12, in order to generate motor commands. Thus, the sensor control module can improve the image signal quality by e.g. restricting the mower movement speed (and thus reducing image blur) or by issuing a certain movement sequence (e.g. a short stopping for HDR imaging).

Figure 4:
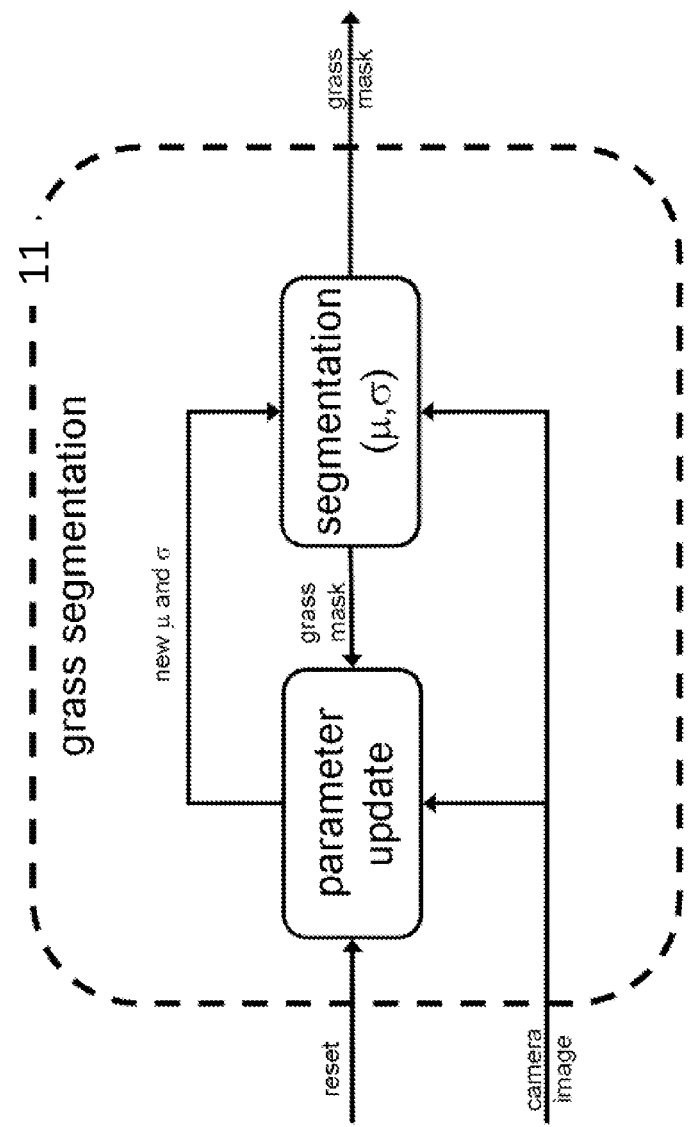
FIG. 4 shows a grass (segmentation) detection module of the system of the present invention.

The grass segmentation module 11 (also referred to as grass detection module), which is shown in FIG. 4, adapts, i.e. updates, its parameters over time, in order to follow changes of the grass color, which can occur because of illumination conditions change. The segmentation process is based on the mean and the variance of the grass color in the HSV space. Thus, the parameter update constitutes a re-estimation of the current mean and variance of the grass color. For the re-estimation the current image is combined with the current grass mask (grass map). Then the mean color and variance of all pixels currently considered as grass are calculated. After checking the new parameters against some predefined limits (i.e. after performing a comparison), the parameters are passed to a segmentation sub-module that performs the segmentation. The comparison with the limits is necessary to prevent the system from drifting into invalid states, where grass can no longer be identified. The segmentation procedure will use the new parameters for the next image frame. Optionally the parameters can be reset by the user to default values, which are also used for initialization.

In summary, the core of the present invention is a method and a system for an autonomous mower that is attached with a camera, wherein the control of the parameters of the camera, the control of the mower movement, and the grass detection are optimized holistically in an online (while operating) fashion. The idea is to mitigate the camera sensing limits by adapting the movement speed of the mower. Furthermore, the camera control tries to optimize the visibility of grass by using the grass mask resulting from a grass segmentation (detection) to calculate updated exposure, gain and aperture values from grass pixels only. Additionally, the grass segmentation tracks changes in the grass color that are caused by illumination differences. Optionally, the system is equipped with, preferably dimmable, lighting means 3, which can be used by the system to further improve the camera signal quality in conjunction with the control of the camera parameters and mower movement speed.

The invention claimed is:

1. Control system for an autonomous mower that is equipped with a plurality of sensors, at least one sensor being a camera, and with at least one motor;
    wherein the control system is adapted to perform a combined control of parameters of the plurality of sensors and commands of the at least one motor, and to perform computations on images obtained by the at least one camera, and
    wherein the control of the parameters of the camera and the control of the at least one motor are optimized during operation to mitigate camera sensing limits by adapting a movement speed of the at least one motor.

2. Control system according to claim 1, comprising
    a grass detection module for using images from the at least one camera to classify pixels in the images to be grass or non-grass, thereby creating a grass map;
    a sensor control module for combining the grass map with current sensor data to improve the parameters of the plurality of sensors, wherein the intensities of the pixels marked as grass are used to adjust the parameters of the at least one camera;
    a motor control module for controlling the movement of the autonomous mower via the at least one motor according to the grass map and affected by parameters of the plurality of sensors that are changeable by the sensor control module;
    wherein the sensor control module is adapted to modify parameters of the motor control module, in order to improve the sensor data.

3. Control system according to claim 2, wherein
    the autonomous mower is equipped with means of lighting, and
    the sensor control module is adapted to switch on the means of lighting, if an operation limit of the at least one camera is reached.

4. Control system according to claim 3, which is adapted to dim the means of lighting.

5. Control system according to claim 2, where the grass detection module is adapted to perform the grass detection by color segmentation.

6. Control system according to claim 5, which is adapted to adjust parameters over time, in order to keep track of slight changes of the grass color due to varying lighting conditions, grass conditions or different grass types.

7. Control system according to claim 2, wherein the sensor control module is adapted to adjust parameters, at least exposure, gain and/or aperture, of the at least one camera.

8. Control system according to claim 7, wherein the sensor control module is adapted to optimize the mean intensity of the camera images by equalizing the dynamic range.

9. Control system according to claim 2, wherein the sensor control module is adapted to instruct the motor control module to drive the autonomous mower slower, if the autonomous mower approaches an obstacle.

10. Control system according to claim 2, wherein the sensor control module is adapted to instruct the motor control module to drive the autonomous mower slower, if longer exposure times and/or longer times for adapting the camera exposure are required by the at least one camera.

11. Control system according to claim 2, wherein the sensor control module is adapted to instruct the motor control module to stop the autonomous mower for a certain time.

12. Control system according to claim 2, wherein
the autonomous mower is equipped with a sonar sensor, and
the sensor control module is adapted to instruct the motor control module to drive the autonomous mower slower, if one of the plurality of sensors detects wind above a predetermined threshold value.

13. Control system according to claim 2, wherein
the autonomous mower is equipped with an infrared sensor and an infrared light source, and
wherein the sensor control module is adapted to switch on/off or to dim the infrared light source, when the infrared sensor detects infrared light emission below a predetermined threshold value.

14. Control system according to claim 1, wherein the autonomous mower has at least two cameras wherein preferably one of the at least two cameras faces the rear of the autonomous mower.

15. Control system according to claim 1, wherein the at least two cameras are a stereo camera, wherein both are facing in the same direction in this case, preferably to the front.

16. Control system according to claim 14, wherein at least one of the at least two cameras is a RGB camera and at least one is a near-infrared camera.

17. Control system according to claim 14, which is adapted to
set the same parameters for the at least two cameras, when the lighting conditions are normal,
set different parameters for the at least two cameras, when the lighting conditions exhibit strong contrast,
and to combine at least two of the camera images into a high dynamic range image.

18. Autonomous mower comprising
a plurality of sensors, preferably a sonar sensor and/or and an infrared sensor;
at least one camera;
at least one motor;
preferably means of lighting and/or an infrared light source; and
a control system according to claim 1.

19. Control method for an autonomous mower that is equipped with a plurality of sensors, at least one sensor being a camera, and with at least one motor;
wherein the control method comprises steps of performing a combined control of parameters of the plurality of sensors and commands of the at least one motor, and performing computations on images obtained by the at least one camera, and
wherein the control of the parameters of the camera and the control of the at least one motor are optimized during operation to mitigate camera sensing limits by adapting a movement speed of the at least one motor.

20. Control method according to claim 19, comprising the steps of
a grass detection step using images from the at least one camera to classify pixels in the images to be grass or non-grass, thereby creating a grass map;
a sensor control steps combining the grass map with current sensor data to improve the parameters of the plurality of sensors, wherein the intensities of the pixels marked as grass are used to adjust the parameters of the at least one camera;
a motor control step controlling the movement of the autonomous mower via the at least one motor according to the grass map and affected by parameters of the plurality of sensors that are changeable in the sensor control step;
wherein the sensor control step modifies parameters used in the motor control step, in order to improve the sensor data.

* * * * *